July 26, 1955
V. L. FRAZIER
2,714,014
AXLE LOAD EQUALIZING ASSEMBLY
Filed Oct. 15, 1951
3 Sheets-Sheet 1
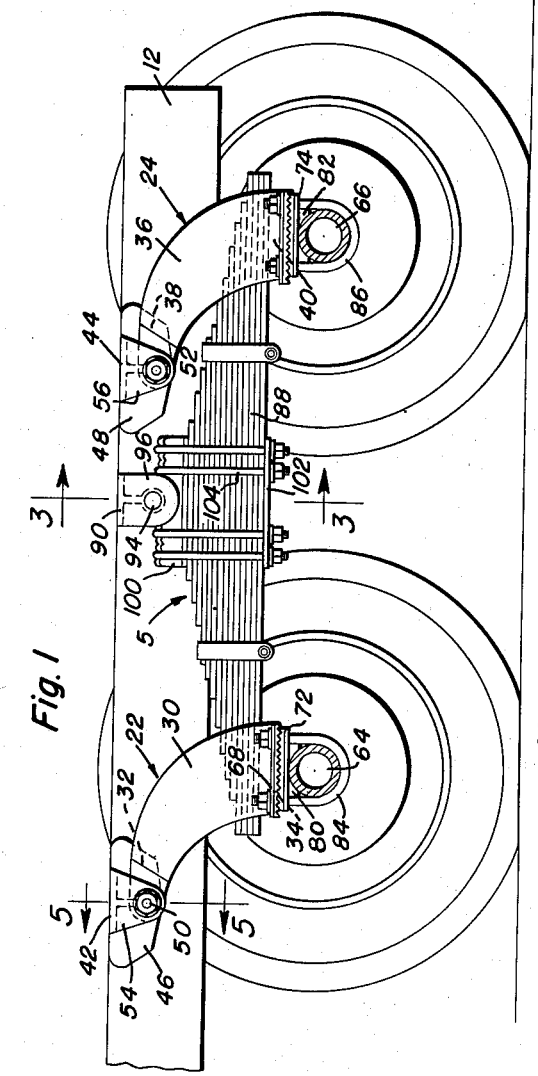
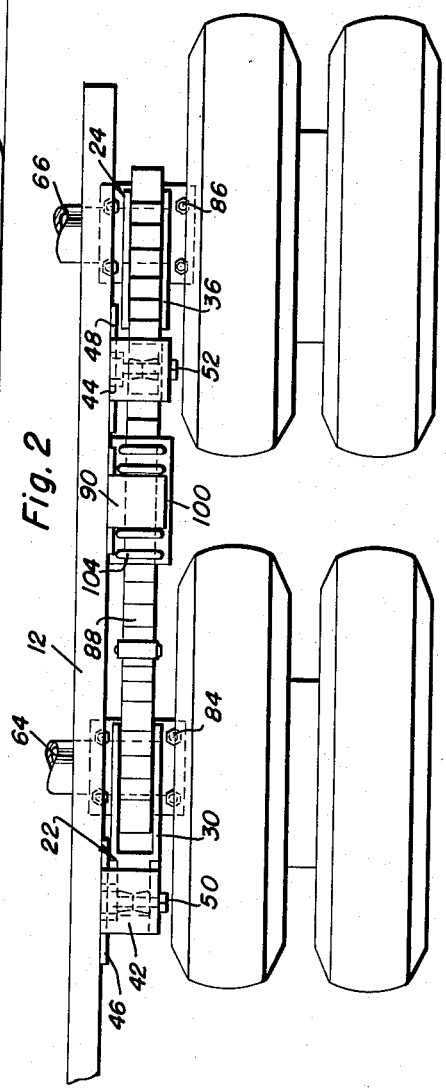
Van L. Frazier
INVENTOR.

July 26, 1955  V. L. FRAZIER  2,714,014
AXLE LOAD EQUALIZING ASSEMBLY
Filed Oct. 15, 1951  3 Sheets-Sheet 2

Van L. Frazier
INVENTOR.

BY *(signatures)*
Attorneys

July 26, 1955     V. L. FRAZIER     2,714,014

AXLE LOAD EQUALIZING ASSEMBLY

Filed Oct. 15, 1951     3 Sheets-Sheet 3

Van L. Frazier
INVENTOR.

United States Patent Office 2,714,014
Patented July 26, 1955

2,714,014

AXLE LOAD EQUALIZING ASSEMBLY

Van L. Frazier, Springfield, Mo., assignor to Frazier Tandem Systems, Inc., Springfield, Mo., a corporation of Missouri Application October 15, 1951, Serial No. 251,373

7 Claims. (Cl. 280—104.5)

This invention relates to new and useful improvement in axle mounts and is a continuation-in-part of my co-pending application Serial No. 206,048, filed January 15, 1951, now Patent No. 2,653,034, dated September 22, 1953.

The primary object of the present invention is to provide an axle mount so constructed as to distribute the load on the axles of a vehicle so as to avoid overloading penalties under certain state weight laws.

Another important object of the present invention is to provide an axle load equalizing assembly composed of forward and rear pairs of axle holding stabilizer arms that are pivotally connected to a vehicle frame by torque arms so that the axles carried by the stabilizer arms may move in substantially vertical planes.

Yet another object of the present invention is the provision of an axle load equalizing assembly functioning as a combined leaf spring holder and retainer and axle carrier.

A further object of the present invention is to provide an axle load equalizing assembly composed of side units including forward and rear parallelogram mounting members each having a portion for attachment to a frame and another portion for attachment to an axle and which will also engage a leaf spring, the two portions of each mounting member being connected by torque arms, one of which is adjustable.

A still further aim of the present invention is to provide an axle load equalizing assembly that is quickly and readily attached to or removed from a vehicle frame and which is composed of parts that are conveniently separable for repair or replacement.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of one form of the invention mounted on a vehicle frame;

Figure 2 is a fragmentary plan view of Figure 1 to show the assembly at one side of the frame;

Figure 6 is a side elevational view of the second form of the present invention mounted on a vehicle frame and with parts of the invention broken away and shown in section; and, Figure 7 is a fragmentary plan view of the form of the invention shown in Figure 6 mounted on a vehicle frame.

Figure 3:
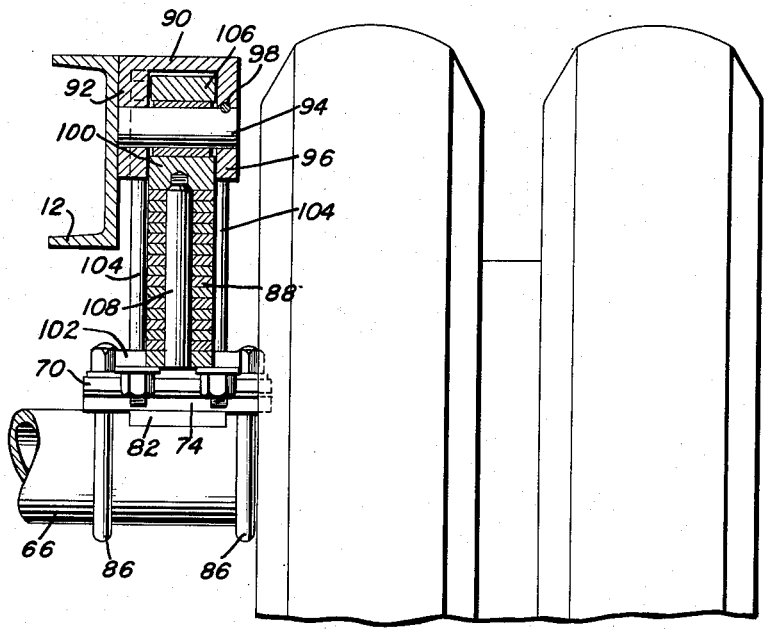
Figure 3 is an enlarged detail vertical sectional view taken substantially on the plane of section line 3—3 of Figure 1.

Referring now to the drawings in detail, and more particularly to Figures 1–5 inclusive, wherein for the purpose of illustration, there is disclosed one form of the invention involving an axle load equalizing assembly whose structure is described in my copending application previously mentioned.

The assembly illustrated in Figures 1–5 inclusive comprises a pair of similar side units 5 that are mounted on the side frame members 12 of a vehicle frame. Each side unit 5 includes a rear stabilizer member 24 and a forward stabilizer member 22.

Members 22 are composed of spaced parallel upwardly and forwardly curved plates 30 whose upper forward ends are joined by spacer and connecting plates 32 fixed by welding or the like to the plates 30 or which plates 32 are integrally formed with the plates 30. The lower rear enlarged ends of the plates 30 are joined by seat forming plates 34 that may be permanently secured to or integrally formed with the plates 30. The upper faces of the plates 34 are convex for a purpose later to be described.

Members 24 are identical in construction to members 22 and, therefore, comprise upwardly and forwardly curved spaced plates 36 whose upper ends are joined by plates 38 and whose lower ends are joined by seat forming plates 40 having upper convexed surfaces.

Means is provided for mounting the members 22 and 24 onto the frame members 12. This means comprises forward and rear inverted channel shaped brackets 42 and 44 having inner vertical flanges 46 and 48 that are secured against the outer faces of the members 12 by welding or fasteners.

Horizontal pivots 50 and 52 extend through the inner and outer flanges 46, 48 and 54 and 56 of the brackets 42 and 44. The pins 50 and 52 may be removably supported solely by their supporting brackets or the pins 50 and 52 may be fixed to the frame members 12 and removably secured to the brackets, whereby the brackets may be slipped from the pins.

Figure 4:
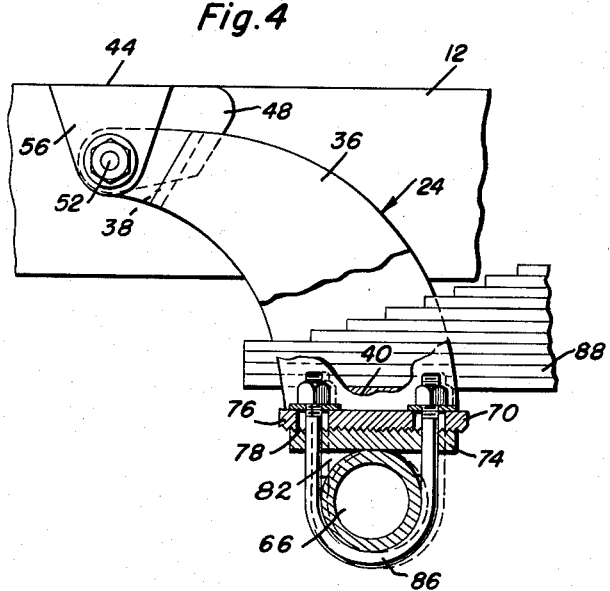
Figure 4 is an enlarged fragmentary view of Figure 1 showing the rear axle mount with parts broken away for the convenience of explanation.
Figure 5:
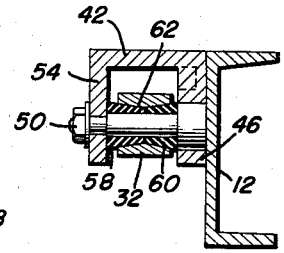
Figure 5 is an enlarged detail vertical sectional view taken substantially on the plane of section line 5—5 of Figure 1.

Each of the pins 50, 52 carries a pair of tapered resilient sleeves 58 and 60. The sleeves 58 and 60 are positioned on the pins with their tapered ends in abutting relation as shown in Figure 4 and the sleeves enter the inwardly tapered ends of openings 62 in the forward reinforced and strengthened ends of the members 22 and 24, also illustrated in Figure 4.

Means is provided for removably securing the members 22 and 24 to forward and rear wheel-carrying axles 64 and 66. This means comprises forward and rear mounting plates 68 and 70 formed with or permanently fixed to the lower rear ends of the plates 30 and 36. The ends of the plates 68 and 70 project outwardly from the plates 30 and 36, and are formed with apertured corners for registering with the corner apertures of clamping plates 72 and 74.

The undersurfaces of plates 68 and 70 are formed with serrations or teeth 76 that are meshed with teeth or serrations 78 on the upper faces of the plates 72 and 74. The reduced thickened portions 80 and 82 of the plates 72 and 74 are provided with concave recesses receiving the upper peripheries of the axles. U-bolts 84 embrace the forward axle 64 and are removably secured in the registering apertures in plates 68 and 72 and additional U-bolts 86 embrace the rear axle 66 and are removably secured in the registering apertures in plates 70 and 74.

A pair of conventional vehicle leaf springs 88 extend between the members 22 and 24. The ends of the springs 88 are received between the plates 30 and 36 and rest upon the convex surfaces of plates 34 and 40, the convex surfaces reducing to a minimum the friction between the contacting surfaces of the springs and plates 34 and 40.

Means is provided for rockably mounting the central portions of springs 88 to the side frame members 12. This means assumes the preferred form of a pair of inverted channel shaped brackets 90 having their inner vertical flanges 92 suitably fixed to the outer faces of the side members 12.

Horizontal pins 94 fixed to the side members project laterally therefrom and extend through the inner and outer flanges 92 and 96 of the brackets 90 and these pins are removably secured to the brackets by keys 98 to constitute a means securing the brackets 90 to the side members.

Upper and lower clamping plates 100 and 102 are joined by U-bolts 104 and retain the leaf sections of spring 88 in juxtaposition. The upper plates 100 are formed with eyes 106 that extend between the flanges 92 and 96 to receive the pins 94. The leaf sections of the springs 88 are joined and retained assembled by vertical centering pins 108.

Reference is now directed to Figures 6 and 7, wherein there is illustrated the present axle load equalizing assembly in slightly modified form. In this embodiment of the present invention, the numeral 200 represents a side unit that is mounted on the frame of the vehicle. One unit 200 is mounted on each of the pair of side frame members 202 of the frame.

Each unit 200 comprises forward and rear stabilizer members or arms 204 and 206. The arms 204 are composed of spaced parallel vertical substantially V-shaped plates 208 whose upper leg portions are joined by combined spacer and retainer angles 210. The lower leg portions of the plates 208 are joined by seat forming plates 212 having upper convexed surfaces.

Arms 206 are identical to the arms 204 and include spaced parallel plates 214 that are joined at their upper leg portions by combined retainer and spacer angles 216 and at their lower leg portions by seat forming plates 218 having upper convexed surfaces.

The lower edges of the lower leg portions of the plates 208 are formed with concaved recesses in which the ends of a forward axle 220 are suitably fixed by welding or the like, and the lower edges of the lower leg portions of the plates 214 are likewise formed with concave recesses in which the ends of a rear axle 222 are suitably fixed by welding or the like.

Forward and rear inverted channel shaped brackets 224 and 226 include inner vertical flanges 228 and 230 that are fixed against the outer faces of the frame members 202 and their inner and outer flanges 228, 230 and 232, 234 support horizontal pivots 236 and 238 that extend through the upper eye ends of forward and rear upper links or torque arms 240 and 242. The rear eye ends of the arms 240 and 242 are pivoted between the upper forward ends of the plates 208 and 214 by horizontal pivots 244 and 246.

The lower ends of the brackets 224 and 226 support horizontal pivots 248 and 250 that extend through the forward eye ends of lower forward and rear adjustable links or torque arms 252 and 254. The rear eye ends of the arms 252 and 254 are pivotally mounted between the lower forward ends of plates 208 and 214 by horizontal pivots 256 and 258.

The eye ends of the arms 252 and 254 are provided with hollow internally threaded shanks that receivably engage the ends of threaded rods 260 and 262 carrying adjusting nuts 264 and 266 on their intermediate portions, whereby the pivots 256 and 258 may be manually moved from or toward the pivots 248 and 250, respectively.

The inner and outer flanges of inverted channel shaped brackets 268 mounted on the members 12, carry horizontal pivots 270 that extend through eyes on upper clamping plates 272. Clamping plates 272 are connected to lower clamping plates 274 by U-bolts 276 and juxtapositioned leaf springs of spring members 278 are held assembled between the plates 272 and 274. The ends of springs 278 rest upon the upper convexed surfaces of the plates 212 and 218 and are located under members 210 and 216.

Members 226, 242, 206 and 254 form a parallelogram and this is likewise true of members 224, 240, 204 and 252 of arms 204. Due to this structural arrangement, the axles 222 and 220 will move in substantially vertical planes that are parallel to each other. The weight of the frame will be borne by the axles 220 and 222 equally due to the identical construction of the units 204 and 206 and the location of bracket 268 centrally between the ends of springs 278.

Unequal weight distribution on the axles 220 and 222 may be equalized by adjustment of the adjustable torque arms 252 or 254, or both torque arms 252 and 254.

Having described the invention, what is claimed as new is:

1. An axle load equalizing assembly comprising forward and rear stabilizer arms adapted to be fixed to forward and rear parallel axles, spring seats forming part of said arms for disposition directly above the axles to which the stabilizer arms are adapted to be fixed, a leaf spring extending between said arms and terminally slidably seated on said spring seats, forward and rear brackets adapted to be mounted on a frame in front of said arms, upper pitmans connecting the arms to the brackets, lower pitmans also connecting the arms to the brackets and paralleling the upper pitmans, and a mounting bracket disposed between and spaced from the rear bracket and the forward arm and pivotally supporting the spring and adapted for attachment to the frame supporting the forward and rear brackets.

2. An axle load equalizing assembly comprising forward and rear stabilizer arms adapted to be fixed to forward and rear parallel axles, spring seats forming part of said arms for disposition directly above the axles to which the stabilizer arms are adapted to be fixed, a leaf spring extending between said arms and terminally slidably seated on said spring seats, forward and rear brackets adapted to be mounted on a frame and disposed in front of said arms, upper rigid torque arms terminally pivoted to said stabilizer arms and said brackets, lower adjustable torque arms terminally pivoted to said stabilizer arms and said brackets, and means disposed between and spaced from the rear bracket and the forward arm rockably supporting the central portion of said spring and adapted for mounting on the frame supporting the brackets.

3. The combination of claim 2 wherein said adjustable torque arms each comprise a pair of eye members having internally threaded hollow shank portions and a threaded rod having its ends receivably engaged in said shanks.

4. An axle load equalizing assembly comprising forward and rear stabilizer arms each having a bifurcated upper portion and a plate secured between the furcations of each stabilizer arm, a leaf spring extending between the arms and having its ends received between the furcations of the arms and seated on the plates, forward and rear brackets disposed in front of said forward and rear arms respectively, upper torque arms terminally pivoted to the upper portions of said stabilizer arms and the brackets, lower adjustable torque arms terminally pivoted to said stabilizer arms and said brackets, and means disposed between and spaced from the rear bracket and the forward arm rockably supporting the spring and adapted for mounting on a frame that will support the brackets.

5. An axle load equalizing assembly comprising forward and rear stabilizer arms each having a bifurcated upper portion and a plate secured between the furcations of each stabilizer arm, a leaf spring extending between the arms and having its ends received between the furcations of the arms and seated on the plates, forward and rear brackets disposed in front of said forward and rear arms respectively, upper torque arms terminally pivoted to the upper portions of said stabilizer arms and the brackets, lower adjustable torque arms terminally pivoted to said stabilizer arms and said brackets, and means disposed between and spaced from the rear bracket and the forward arm rockably supporting the spring and adapted for mounting on a frame that will support the brackets, said plates having convexed upper faces against which the ends of said spring rest to reduce friction between the contacting surfaces of said spring and said plates.

6. The combination of claim 4 and a rigid stop element fixed between the furcations of each stabilizer arm and overlying the ends of said springs to limit upward flexing of the ends of said springs from said plates.

7. In a vehicle including a frame composed of parallel side members and forward and rear wheel carrying axles extending between and located under the side members, an axle load equalizing assembly permitting the forward and rear axles to rise in substantially vertical planes, said assembly comprising a rear pair of stabilizer arms fixed to the rear axle alongside of said side members, a forward pair of stabilizer arms fixed to the forward axle alongside of said side members, said forward and rear stabilizer arms each comprising a pair of spaced plates extending upwardly from the axle to which they are fixed and a seat element fixed between each pair of plates, a pair of leaf springs extending alongside of the side members and between the forward and rear stabilizer arms, said spring having rear portions seated on the seat elements of the rear arms and forward portions seated on the seat elements of the forward arms, a rear pair of brackets secured to the side members in front of the rear arms, upper rear torque arms terminally pivoted to the rear brackets and the rear stabilizer arms, lower rear adjustable torque arms terminally pivoted to the rear stabilizer arms and the rear brackets, a forward pair of brackets secured to the side members in front of the forward stabilizer arms, upper forward torque arms terminally pivoted to the forward brackets and the forward stabilizer arms, lower forward adjustable torque arms terminally pivoted to the forward brackets and the forward stabilizer arms, and a pair of spring mounting brackets secured to the frame between and spaced from the rear brackets and the forward stabilizer arms and rockably supporting the central portions of said springs.

References Cited in the file of this patent

UNITED STATES PATENTS

| | | |
|---|---|---|
| 1,761,135 | Le Moon | June 3, 1930 |
| 1,940,914 | Marcum | Dec. 26, 1933 |
| 2,098,522 | Simning | Nov. 9, 1937 |
| 2,410,747 | Reid | Nov. 5, 1946 |
| 2,520,778 | Page | Aug. 29, 1950 |

FOREIGN PATENTS

| | | |
|---|---|---|
| 732,660 | France | June 20, 1932 |